(12) United States Patent
Fujii et al.

(10) Patent No.: US 9,567,909 B2
(45) Date of Patent: Feb. 14, 2017

(54) INTAKE AIR COOLING SYSTEM

(71) Applicant: Mitsubishi Hitachi Power Systems, Ltd., Yokohama-shi, Kanagawa (JP)

(72) Inventors: Keita Fujii, Tokyo (JP); Yasuoki Tomita, Tokyo (JP); Jiro Asakuno, Tokyo (JP); Masaru Takamatsu, Tokyo (JP); Tadakuni Nishio, Tokyo (JP); Tatsunao Nagashima, Tokyo (JP); Katsuhiro Hotta, Tokyo (JP); Masashi Nishimura, Tokyo (JP)

(73) Assignee: MITSUBISHI HITACHI POWER SYSTEMS, LTD., Yokohama-shi (JP)

( * ) Notice: Subject to any disclaimer, the term of this patent is extended or adjusted under 35 U.S.C. 154(b) by 394 days.

(21) Appl. No.: 14/220,189

(22) Filed: Mar. 20, 2014

(65) Prior Publication Data

US 2014/0290911 A1 Oct. 2, 2014

(30) Foreign Application Priority Data

Mar. 27, 2013 (JP) ................................. 2013-066828

(51) Int. Cl.
F02C 7/143 (2006.01)

(52) U.S. Cl.
CPC ......... *F02C 7/143* (2013.01); *F05D 2250/711* (2013.01); *F05D 2260/602* (2013.01)

(58) Field of Classification Search
CPC ............ F01D 25/32; F02C 7/04; F02C 7/045; F02C 7/143; F05D 2250/711; F05D 2260/602
See application file for complete search history.

(56) References Cited

U.S. PATENT DOCUMENTS

2009/0049836 A1 2/2009 Erickson et al.

FOREIGN PATENT DOCUMENTS

| JP | 2006-037877 A | 2/2006 |
| JP | 2007-120479 A | 5/2007 |

OTHER PUBLICATIONS

IT Unversita' Degli Studi Di Bologna, "A Parametric Evaluation of Fogging Technology for Gas Turbine Performance Enhancement", Ph. D. Thesis, 2004.
Office Action dated May 2, 2016, issued in counterpart Taiwanese Patent Application No. 103110353. (4 pages).

*Primary Examiner* — Corey Skurdal
(74) *Attorney, Agent, or Firm* — Westerman, Hattori, Daniels & Adrian, LLP

(57) ABSTRACT

An intake air cooling system 100 for a gas turbine 18 is provided with: an intake duct 12 for leading intake air taken in from an intake-air inlet 22 to a compressor 14 of the gas turbine; a cooling part provided in the intake duct and configured to cool the intake air by heat exchange with a cooling medium which is introduced from an outside; a protruding step part 13 formed in a convex shape protruding from bottom surfaces 12*a*1, 12*a*2 of the intake duct disposed on a downstream side of the cooling part; and at least one drain hole 110 formed in the bottom surfaces 12*a*1, 12*a*2 of the intake duct disposed on the downstream side of the cooling part so as to discharge drain water, generated on a surface of the cooling part and dropping from the surface, to an outside of the intake duct.

14 Claims, 2 Drawing Sheets

INTAKE AIR COOLING SYSTEM

TECHNICAL FIELD

The present invention relates to an intake air cooling system for cooling intake air of a gas turbine.

BACKGROUND ART

In a gas turbine for power generation which is configured by a compressor, a combustor, a turbine, etc., the temperature of air taken into the compressor affects output of the turbine. For instance, in summer season when the atmospheric temperature is high, density of the intake air decreases and thus a mass flow rate decreases, hence the output of the turbine decreases. To suppress this sort of decrease in output of the turbine, intake air cooling systems have been developed, including an intake air cooling system equipped with an intake air cooling coil for lowering the temperature of air taken in from outside by heat exchange with cooling medium and an intake air cooling system which sprays water to the intake air to cool the intake air using heat of vaporization of the sprayed water. With the intake air cooling system equipped with the intake air cooling coil, moisture in the atmosphere is cooled by heat exchange with the intake air cooling coil and condensed into drain water. The drain water is then collected by a drain pan arranged below the intake air cooling coil and is discharged from a drain pipe.

In the case where this intake air cooling system is used, however, the drain water adhering to a surface of the intake air cooling coil may scatter to a downstream side along with the intake air passing through the intake air cooling coil, or the drain water may fail to be collected by the drain pan and leak from the drain pan. Therefore, there are issues such as damage to blades of the compressor caused by erosion or lock of the compressor due to entry of the drain water into the compressor disposed on the intake side of the gas turbine. As a conventional technique for preventing the drain water from entering the compressor of the gas turbine, Patent Reference 1 discloses an intake air cooling device for a gas turbine, in which a mist removing means is provided on a downstream side of the intake duct of a vaporizer so as to remove mist from the intake air by collecting unvaporized mist. Further, Patent Reference 2 discloses a gas turbine which is provided with grooves that are formed in rotation symmetry in an inner wall surface of a flow passage, where operating air supplied with water flows, or in a rotor or a casing flow passage surface of the gas turbine, so as to collect mist adhering to the inner wall surface or the flow passage surface.

CITATION LIST

Patent Reference

[Patent Reference 1]
JP 2007-120479 A
[Patent Reference 2]
JP 2006-037877 A

SUMMARY

Technical Problem

In an intake air cooling system equipped with a cooling coil, a drain pan is provided under the cooling coil to collect drain water generated by condensation of moisture on the surface of the cooling coil. There is a concern that the drain water is generated excessively during supercooling, etc. and the drain water uncollected by the existing drain pan leaks from the drain pan and flows to the downstream side to reach the manifold part on the gas turbine inlet side and accumulates there. When the accumulated drain water exceeds the limit, the drain water enters the compressor of the gas turbine, causing lock or breakdown of the compressor, damage to compressor blades, and so on. The above mentioned Patent Reference 1 and Patent Reference 2 refer to collecting the drain water passing through the intake duct or the drain water in the form of mist adhering to the wall surface of the intake duct, but there is no description regarding the drain water leaking from the drain pan.

The present invention has been made in view of the above issues and is intended to provide a new and improved intake air cooling system which is capable of collecting drain water which leaks from a drain pan of a cooling coil.

Solution to Problem

One aspect of the present invention is an intake air cooling system for a gas turbine, the system comprising:
an intake duct configured to lead intake air taken in from an intake-air inlet to a compressor of the gas turbine;
a cooling part provided in the intake duct and configured to cool the intake air by heat exchange with a cooling medium which is introduced from an outside;
a protruding step part formed in a convex shape protruding from a bottom surface of the intake duct disposed on a downstream side of the cooling part; and
at least one drain hole formed in the bottom surface of the intake duct disposed on the downstream side of the cooling part, the at least one drain hole being configured to discharge drain water generated on a surface of the cooling part and dropping from the surface to an outside of the intake duct.

According to this aspect of the present invention, at least one drain hole for discharging the drain water to the outside of the intake duct is formed in the bottom surface of the intake duct disposed on the downstream side of the cooling part. Thus, the drain water which drops from the cooling part and then leaks from the drain pan can be discharged to the outside of the intake duct.

In this case, in one aspect of the present invention, the at least one drain hole may be formed in the bottom surface of the intake duct which is disposed between the cooling part and the protruding step part.

With this configuration, the drain water accumulating between the cooling part and the protruding step part can be discharged to the outside of the intake duct.

Further, in one aspect of the present invention, a silencer may be provided in the protruding step part to muffle noise generated when taking in the air, and the at least one drain hole may further be formed in a bottom surface of the intake duct which is disposed on an outlet side of the silencer.

With this configuration, it is possible to efficiently collect the drain water which is generated by condensation of moisture on the surface of the silencer and flows downward.

Furthermore, in one aspect of the present invention, the at least one drain hole may be connected to a drain discharge line which is configured to discharge the drain water to the outside of the intake duct.

With this configuration, the drain water collected by the at least one drain hole can be discharged to the outside of the intake duct through the drain discharge line.

Advantageous Effects

According to the present invention described above, the at least one drain hole is formed in the bottom surface of the intake duct disposed on the downstream side of the cooling coil and thus, it is possible to collect the drain leaking from the drain pan by the drain hole. Therefore, it is possible to prevent breakdown or damage of the compressor caused by the drain water leaking from the drain pan and entering the compressor.

DETAILED DESCRIPTION

An embodiment of the present invention will now be described in detail with reference to the accompanying drawings. It is intended, however, that unless particularly specified, dimensions, materials, shapes, relative positions and the like of components described in the embodiment shall be interpreted as illustrative only and not limitative of the scope of the present invention.

Figure 1:
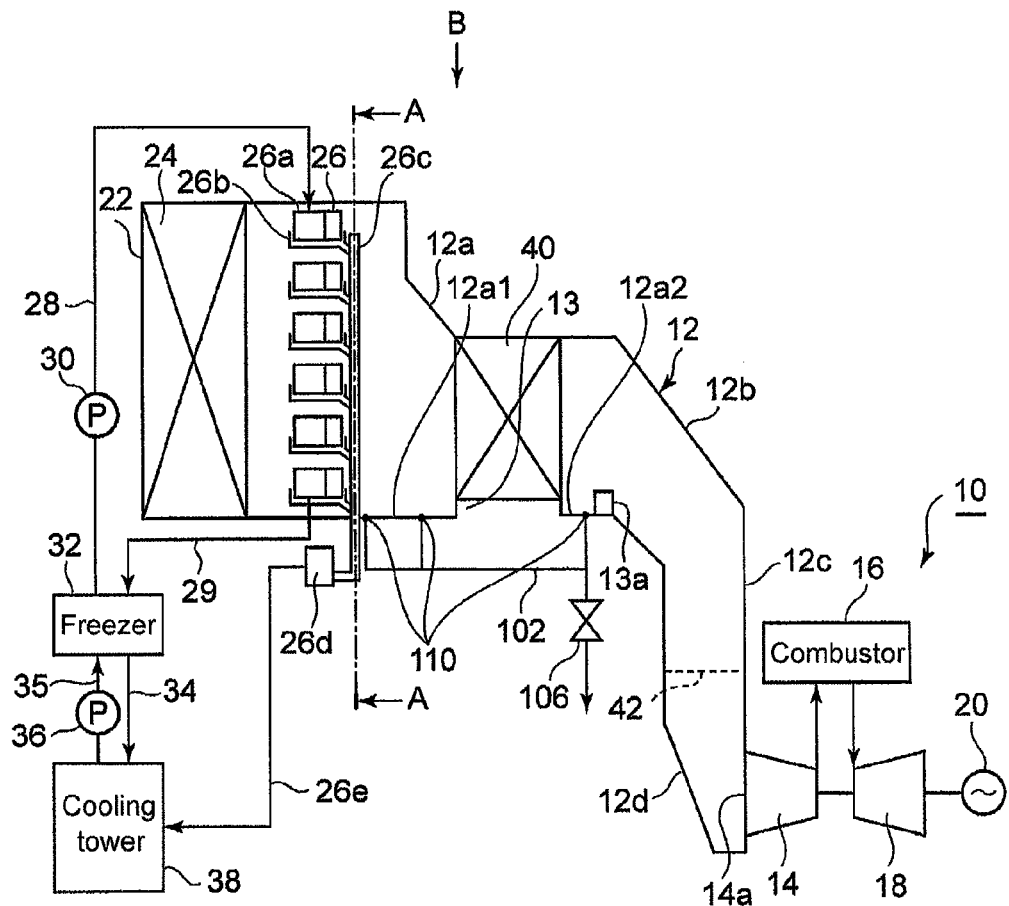
FIG. 1 is a block diagram showing a configuration of a gas turbine plant equipped with an intake air cooling system according to one embodiment of the present invention.
Figure 2:
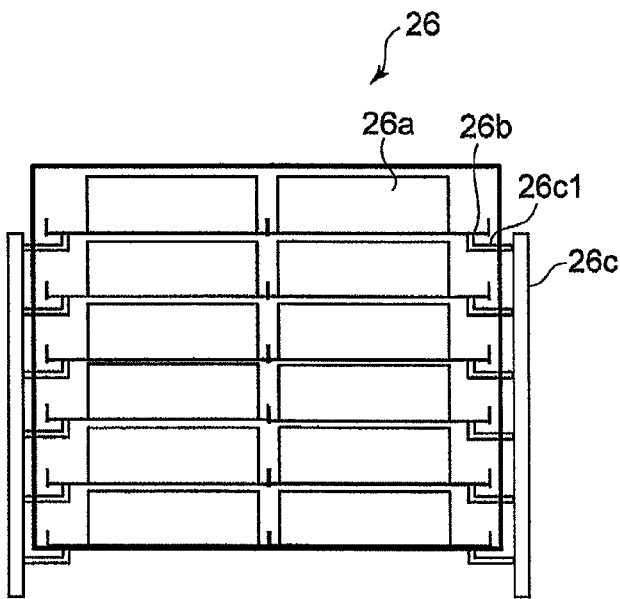
FIG. 2 is a schematic configuration view of a cooling coil provided in the intake air cooling system according to one embodiment of the present invention.

The configuration of the intake air cooling system according to one embodiment of the present invention is described in reference to the accompanying drawings. FIG. 1 is a block diagram showing a configuration of a gas turbine plant equipped with the intake air cooling system according to one embodiment of the present invention. FIG. 2 is a schematic configuration view of a cooling coil provided in the intake air cooling system according to one embodiment of the present invention.

A gas turbine plant 10 serving as a power generation plant comprises an intake duct 12, a compressor 14, a combustor 16, a gas turbine 18 and a generator 20. Further, an intake air cooling system 100 is provided in the gas turbine plant 10 to cool intake air of the gas turbine 18. In this embodiment, the intake air cooling system 100 comprises at least the intake duct 12, a cooling coil 26, a chiller 32, a cooling tower 38, a drain discharge line 102, and a drain hole 110.

The intake duct 12 is configured to lead the intake air (outside air: air) taken in from an intake-air inlet 22 to the compressor 14. The compressor 14 is configured to compress the intake air supplied via the intake duct 12. The combustor 16 is configured to combust fuel using the compressed air supplied from the compressor 14. The gas turbine 18 is configured to be rotated by combustion gas supplied from the combustor 16. The generator 20 is configured to generate power by rotation of the gas turbine 18.

The intake duct 12 comprises, as illustrated in FIG. 1, a horizontal duct 12a, a curved duct 12b, and a vertical duct 12c in this order from an upstream side to a downstream side. On a downstream side of the vertical duct 12c, a manifold part 12d for leading and straightening the intake air to the compressor 14 is provided. In this embodiment, the manifold part 12d is configured to extend downward via the vertical duct 12c curving downward in a direction perpendicular to the horizontal duct 12a.

On the inlet side of the intake duct 12, a prefilter 24 is provided to remove relatively large particles of dust or the like from the intake air taken in from the intake-air inlet 22. Further, on a downstream side of the prefilter 24 in the intake duct 12 (the horizontal duct 12a), the cooling coil 26 is provided to cool the intake air exiting the prefilter 24 by heat exchange with a cooling medium introduced from an outside.

The cooling coil 26 is a cooling part for cooling the intake air and, as illustrated in FIG. 2, is configured such that a plurality of unit-like chiller coils 26a is arranged in parallel in the vertical direction. Under each of the chiller coils 26a of the cooling coil 26, a drain pan 26b is provided to collect drain water generated by condensation of moisture cooled by heat exchange. The drain water collected by the drain pan 26b flows along a drain pipe 26c1 at each end of the drain pan 26b and then discharged to the outside of the intake duct 12 via a drain manifold 26c configured to discharge the drain water to the outside of the intake duct 12. The drain water collected by the drain manifold 26c is returned to the cooling tower 38 by a drain discharge pump 26d and is regenerated and then reused as a cooling medium in the cooling tower 38.

Further, cold circulation water (cooling medium) is supplied to the cooling coil 26 from the chiller 32, such as an absorption chiller or a centrifugal chiller, via a first circulation path 28 and a first circulation pump 30. The circulation water is heated by heat exchange with the intake air in the intake air cooling coil 26 and then returned to the chiller 32 via the first circulation path 29. Cold circulation water is supplied to the chiller 32 from the cooling tower 38 via second circulation paths 34, 35 and a second circulation pump 36. The circulation water is used in the chiller 32 to perform heat exchange with the circulation water circulating in the first circulation paths 28, 29 and then returned to the cooling tower 38 via the second circulation path 34 to be cooled again in the cooling tower 38.

Furthermore, a silencer 40 is provided on a protruding step part 13 in the horizontal duct 12a of the intake duct 12 on the downstream side of the cooling coil 26, so as to suppress vibration including noise generated when taking in the air. The protruding step part 13 is formed in a convex shape protruding from a bottom surface 12a1 of the horizontal duct 12a. Further, a filter 42 is provided on the inlet side of the manifold part 12d connected to the vertical duct 12c of the intake duct 12. The filter 42 is provided to remove impurities contained in the intake air introduced via the vertical duct 12c and screws, etc. which have fallen during work or the like in the intake duct. The configuration of the silencer 40 is described later in details.

The intake air cooling system 100 has a function of collecting drain water generated from cooling of the intake air by heat exchange at the cooling coil 26 so as to prevent the drain water from entering the compressor 14. In this embodiment, the drain hole 110 is formed in the bottom surfaces 12a1, 12a2 of the intake duct 12 disposed on the downstream side of the cooling coil 26, so as to discharge drain water generated on a surface of the cooling coil 26 or the silencer 40 and dropping from the surface to an outside of the intake duct 12.

As illustrated in FIG. 1, on the bottom surfaces 12a1, 12a2 of the intake duct 12 disposed on the downstream side of the cooling coil 26, the protruding step part 13 and a downstream-side protruding step part 13a are formed in a convex shape protruding from the bottom surfaces 12a1, 12a2. In this embodiment, the drain hole 110 is provided in the bottom surface 12a1 of the intake duct 12 (the horizontal duct 12a) disposed between the cooling coil 26 and the protruding step part 13, and also in the bottom surface 12a2 of the intake duct 12 (the horizontal duct 12a) disposed between the protruding step part 13 and the downstream-side protruding step part 13a. Each of the drain holes 110 is connected to the drain discharge line 102 which is configured to discharge the drain water to the outside of the intake duct 12. The drain water collected by the drain hole 110 is discharged to the outside of the intake duct 12 via the drain discharge line 102.

Figure 3A:
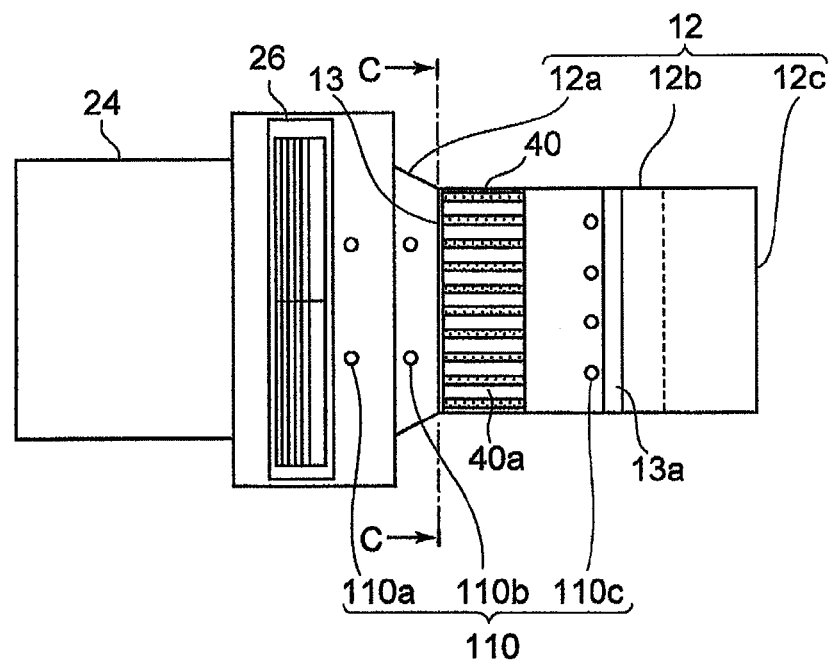
FIG. 3A is an arrow view of a drain hole provided in the intake air cooling system according to one embodiment of the present invention, taken from B direction of FIG. 1.
Figure 3B:
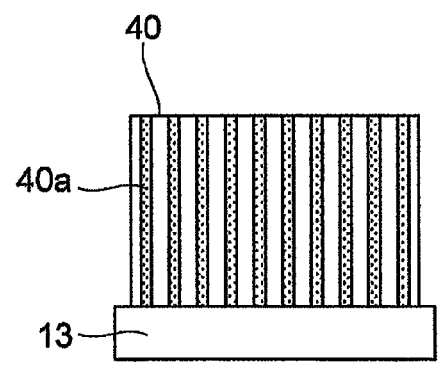
FIG. 3B is an arrow view from C-C direction of FIG. 3A.

The disposition, etc. of the drain holes 110 provided in the intake air cooling system according to one embodiment of the present invention will be described in reference to the accompanying drawings. FIG. 3A is an arrow view of a drain hole provided in the intake air cooling system according to one embodiment of the present invention, taken from B direction of FIG. 1. FIG. 3B is an arrow view from C-C direction of FIG. 3A. In FIG. 3A, an upper side of the intake duct is omitted for the purpose of illustrating the dispositions of the cooling coil, the drain holes and the silencer inside the intake duct.

In this embodiment, as illustrated in FIG. 3A, four drain holes 110 are provided. Specifically, two cooling coil side drain holes 110a and two silencer side drain holes 110b are formed in the bottom surface 12a1 of the intake duct 12 (the horizontal duct 12a) disposed between the cooling coil 26 and the protruding step part 13. The number of the drain holes 110 is not limited to four, and the disposition of the drain holes 110 is not limited to the example illustrated in FIG. 3A.

The bottom surface 12a1 of the intake duct 12 disposed between the cooling coil 26 and the protruding step part 13 has a pool-like shape. This makes it easy for the drain water, which fails to be collected by the drain pan 26b during the supercooling, etc. and leaks to the downstream side, to accumulate in the bottom surface 12a1. Further, the protruding step part 13 protrudes by approximately 250 mm from the bottom surface 12a1 so that the accumulated drain water is dammed and does not easily flow to the downstream side. Therefore, by forming the drain holes 110a, 110b in the bottom surface 12a1, the drain water which fails to be collected by the drain pan 26b and leaks to the downstream side can be efficiently collected and then discharged to the outside of the intake duct 12.

In this embodiment, as illustrated in FIG. 3A, as the drain hole 110, four drain holes 110c are provided at an equal distance from each other in the bottom surface 12a2 of the intake duct 12 (the horizontal duct 12a) disposed between the protruding step part 13 and the downstream-side protruding step part 13a. Specifically, the bottom surface 12a2 of the intake duct 12 disposed between the protruding step part 13 and the downstream-side protruding step part 13a has a pool-like shape, and the drain holes 110c are formed in this bottom surface 12a2. Further, as described earlier, the silencer 40 is provided on the protruding step part 13. The number of the drain holes 110 formed in the bottom surface 12a2 is not limited to four, and the disposition of the drain holes 110 is not limited to the example illustrated in FIG. 3A.

The silencer 40 is configured, as illustrated in FIG. 3A and FIG. 3B, such that a plurality of splitters 40a extending in the flow direction of the intake air and constituted by SUS, aluminum or the like is installed upright in the vertical direction. It was found out that, when the intake air is taken in by the intake duct 12, a large amount of drain water is generated by dew condensation on a surface of each splitter 40a of the silencer 40 and then flows downward on said each splitter 40a. In this embodiment, to efficiently collect the drain water generated at the silencer 40, the drain holes 110c are provided also in the bottom surface 12a2 of the intake duct 12 disposed on the downstream side of the silencer 40.

As described above, in this embodiment, the drain holes 110 are formed in the bottom surfaces 12a1, 12a2 of the intake duct disposed on the downstream side of the cooling coil 26 and on the downstream side of the silencer 40 to collect the drain water generated by dew condensation on the surface of the cooling coil 26 or the silencer 40 during suction of the intake air. Thus, the drain water collected by the drain holes 110 can be efficiently discharged to the outside of the intake duct 12 via the drain discharge line 102. Therefore, it is possible to prevent the drain water generated by dew condensation on the surface of the cooling coil 26 or the silencer 40 from flowing to the downstream side and entering the compressor 14. As a result, it is possible to avoid the risk of causing breakdown, damage, etc. of the compressor 14 due to the drain water entering the compressor 14.

While the embodiment of the present invention has been described, it is obvious to those skilled in the art that various changes and modifications may be made without materially departing from the novel teachings and advantages of this invention. Accordingly, all such modifications are intended to be included within scope of this invention.

Any term cited with a different term having a broader meaning or the same meaning at least once in the specification or the drawings can be replaced by the different term in any place in the specification or the drawings. The configuration and the operation of the intake air cooling system for the gas turbine or the gas turbine plant are not limited to those described in connection with the above embodiment, and various modifications and variations may be made.

REFERENCE SIGNS LIST

10 Gas turbine plant
12 Intake duct
12a Horizontal duct
12a1, 12a2 Bottom surface (of an intake duct)
12b Curved duct
12c Vertical duct
12d Manifold part
13 Protruding step part
13a Downstream-side protruding step part
14 Compressor
14a Inlet (of a compressor)
16 Combustor
18 Gas turbine
20 Generator
22 Intake-air inlet
24 Prefilter
26 Cooling coil (Cooling part)
26a Chiller coil
26b Drain pan
26c Drain manifold
26d Drain discharge pump
28, 29 First circulation path
30 First circulation pump
32 Chiller
34, 35 Second circulation path
36 Second circulation pump
38 Cooling tower 40 Silencer
42 Filter
100 Intake air cooling system
102 Drain discharge line
106 Valve
110, 110a, 110b, 110c Drain hole

The invention claimed is:

1. An intake air cooling system for a gas turbine, the system comprising:
    an intake duct configured to lead intake air taken in from an intake-air inlet to a compressor of the gas turbine;
    a cooling part provided in the intake duct and configured to cool the intake air by heat exchange with a cooling medium which is introduced from an outside;
    a protruding step part formed in a convex shape protruding from a bottom surface of the intake duct disposed on a downstream side of the cooling part; and
    at least one drain hole formed in the bottom surface of the intake duct disposed on the downstream side of the cooling part, the at least one drain hole being configured to discharge drain water, generated on a surface of the cooling part and dropping from the surface, to an outside of the intake duct,
    wherein the intake duct includes a horizontal duct, a curved duct connected to a downstream side of the horizontal duct and curved downwardly, and a vertical duct connected to a downstream side of the curved duct, and
    wherein the protruding step part is protruding from a bottom surface of the horizontal duct.

2. The intake air cooling system according to claim 1, wherein the at least one drain hole is formed in the bottom surface of the horizontal duct which is disposed between the cooling part and the protruding step part.

3. The intake air cooling system according to claim 2, wherein a silencer is provided in the protruding step part to muffle noise generated when taking in the air, and
    wherein the at least one drain hole is further formed in a bottom surface of the horizontal duct which is disposed on an outlet side of the silencer.

4. The intake air cooling system according to claim 1, wherein the at least one drain hole is connected to a drain discharge line which is configured to discharge the drain water to the outside of the intake duct.

5. The intake air cooling system according to claim 2, wherein the at least one drain hole is connected to a drain discharge line which is configured to discharge the drain water to the outside of the intake duct.

6. The intake air cooling system according to claim 3, wherein the at least one drain hole is connected to a drain discharge line which is configured to discharge the drain water to the outside of the intake duct.

7. An intake air cooling system for a gas turbine, the system comprising:
    an intake duct configured to lead intake air taken in from an intake-air inlet to a compressor of the gas turbine;
    a cooling part provided in the intake duct and configured to cool the intake air by heat exchange with a cooling medium which is introduced from an outside;
    a protruding step part formed in a convex shape protruding from a bottom surface of the intake duct disposed on a downstream side of the cooling part; and
    at least one drain hole formed in the bottom surface of the intake duct disposed on the downstream side of the cooling part, the at least one drain hole being configured to discharge drain water, generated on a surface of the cooling part and dropping from the surface, to an outside of the intake duct,
    wherein the protruding step part is disposed on an intermediate region of a bottom surface of a horizontal duct included in the intake duct.

8. The intake air cooling system according to claim 7, wherein the at least one drain hole is formed in the bottom surface of the horizontal duct which is disposed between the cooling part and the protruding step part.

9. The intake air cooling system according to claim 8, wherein a silencer is provided in the protruding step part to muffle noise generated when taking in the air, and
    wherein the at least one drain hole is further formed in a bottom surface of the horizontal duct which is disposed on an outlet side of the silencer.

10. The intake air cooling system according to claim 7, wherein the at least one drain hole is connected to a drain discharge line which is configured to discharge the drain water to the outside of the intake duct.

11. The intake air cooling system according to claim 8, wherein the at least one drain hole is connected to a drain discharge line which is configured to discharge the drain water to the outside of the intake duct.

12. The intake air cooling system according to claim 9, wherein the at least one drain hole is connected to a drain discharge line which is configured to discharge the drain water to the outside of the intake duct.

13. An intake air cooling system for a gas turbine, the system comprising:
    an intake duct configured to lead intake air taken in from an intake-air inlet to a compressor of the gas turbine;
    a cooling part provided in the intake duct and configured to cool the intake air by heat exchange with a cooling medium which is introduced from an outside;
    a protruding step part formed in a convex shape protruding from a bottom surface of the intake duct disposed on a downstream side of the cooling part; and
    at least one drain hole formed in the bottom surface of the intake duct disposed on the downstream side of the cooling part, the at least one drain hole being configured to discharge drain water, generated on a surface of the cooling part and dropping from the surface, to an outside of the intake duct,
    wherein the at least one drain hole is formed in the bottom surface of the intake duct which is disposed between the cooling part and the protruding step part,
    wherein a silencer is provided in the protruding step part to muffle noise generated when taking in the air, and
    wherein the at least one drain hole is further formed in a bottom surface of the intake duct which is disposed on an outlet side of the silencer.

14. The intake air cooling system according to claim 13, wherein the at least one drain hole is connected to a drain discharge line which is configured to discharge the drain water to the outside of the intake duct.

* * * * *